United States Patent [19]

Gourley

[11] 4,283,332
[45] Aug. 11, 1981

[54] AZO DYES CONTAINING FLUORINATED CARBOXYLIC OR SULPHONIC ESTER GROUPS ON THE DIAZO MOIETY

[75] Inventor: Robert N. Gourley, Formby, England

[73] Assignee: Eastman Kodak Company, Rochester, N.Y.

[21] Appl. No.: 108,723

[22] Filed: Dec. 31, 1979

[30] Foreign Application Priority Data

Nov. 6, 1979 [GB] United Kingdom ............... 38335/79

[51] Int. Cl.$^3$ .................... C09B 29/085; C09B 29/26; C09B 29/36; C09B 29/44
[52] U.S. Cl. .................................... 260/155; 260/152; 260/154; 260/156; 260/157; 260/158; 260/162; 260/163; 260/165; 260/205; 260/206; 260/207; 260/207.1; 260/207.3; 260/207.5
[58] Field of Search ............... 260/152, 154, 155, 156, 260/157, 158, 162, 163, 165, 205, 207, 207.1, 206, 207.3, 207.5

[56] References Cited

U.S. PATENT DOCUMENTS

| | | | |
|---|---|---|---|
| 2,805,218 | 9/1957 | Towne et al. | 260/152 |
| 3,360,507 | 12/1967 | Fisher et al. | 260/147 |
| 4,085,099 | 4/1978 | Leroy et al. | 260/158 |

FOREIGN PATENT DOCUMENTS

| | | | |
|---|---|---|---|
| 741331 | 8/1966 | Canada | 260/207.1 |
| 2602173 | 7/1976 | United Kingdom | 260/158 |

*Primary Examiner*—Floyd D. Higel
*Attorney, Agent, or Firm*—Donald W. Spurrell; Daniel B. Reece, III

[57] ABSTRACT

Disclosed are novel azo dyes of the structure

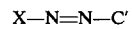

X—N=N—C' wherein X represents the diazonium component comprising phenyl or a heterocyclic group commonly used in azo dyes and which is substituted by one or more fluorinated carboxylic or sulphonic ester groups. Additionally, X may be substituted by any of the groups commonly used in diazonium components such as nitro, cyano, halogen and the like. C' represents an aniline, tetrahydroquinoline or benzomorpholine coupler of the type commonly used in azo dyes. The dyes can be used in both the dyeing and heat transfer printing of textiles, are surprisingly bathochromic in shade, exhibit a good balance of properties such as light, crock, wash, and gas fastness, leveling, pH stability, and dyeability, and have unexpected thermal and hydrolytic stability as compared for example, to the hydrogen analogues. The dyes have particular utility on polyester fibers especially as regards lightfastness.

7 Claims, No Drawings

AZO DYES CONTAINING FLUORINATED CARBOXYLIC OR SULPHONIC ESTER GROUPS ON THE DIAZO MOIETY

This invention concerns novel azo dyes of the structure $$X-N=N-C'$$

wherein X represents a diazonium component selected from phenyl, thienyl, thiazolyl, diazolyl, thiadiazolyl (1,2,4- and 1,3,4-), benzothiazolyl, isothiazolyl, and benzisothiazolyl, all of which are substituted by up to two fluorinated carboxylic or sulphonic ester groups, and which may be substituted further with commonly employed substituents such as nitro, cyano, halogen, alkoxy, and the like. The fluorinated ester group is represented by the structure —Z—O—R wherein Z can be either —CO— or —SO$_2$— and R represents a fluoroaliphatic radical containing from one to eighteen carbon atoms, straight chain, branched chain or alicyclic, and which can be partly or completely fluorinated. C' represents an aniline, tetrahydroquinoline or benzomorpholine coupler of the type commonly used in azo dyes.

The dyes of the present invention can be used for both dyeing and heat transfer printing of textiles in shades from yellow to blue. The fluorinated ester group in the diazonium component is introduced by reaction of a carboxylic or sulphonic acid or acid chloride with a fluorinated alcohol in the presence of pyridine. The amino group can then be introduced by e.g. reduction of a nitro group, displacement of a halogen group by ammonia or hydrolysis of an amide.

The diazo moieties useful in the present invention have the formulae:

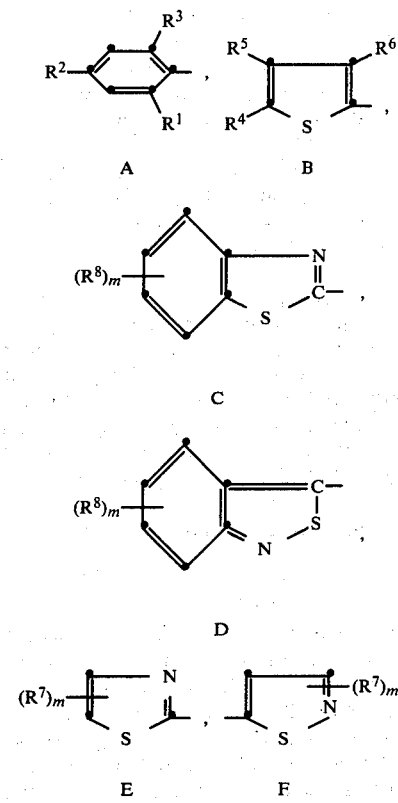

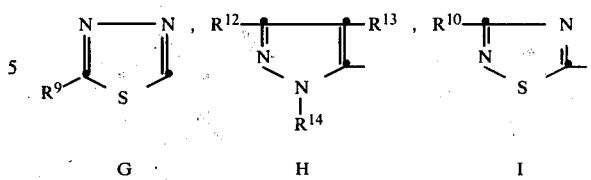

wherein up to two of the substituents $R^1$ through $R^{13}$ on each radical is a fluorinated ester group of the structure —Z—O—R wherein Z is either —CO— or —SO$_2$—, and R is a fluoroaliphatic radical containing one to eighteen carbons, straight chain, branched chain or alicyclic, and which is partly or completely fluorinated; and otherwise:

$R^1$ is hydrogen, halogen, cyano, formyl, lower alkanoyl, benzoyl, lower alkoxycarbonyl, lower alkylsulfonyl, sulfamoyl, lower alkylsulfamoyl, carbamoyl, lower alkylcarbamoyl, or trifluoromethyl;

$R^2$ is halogen, cyano, lower alkylsulfonyl, formyl, lower alkanoyl, benzoyl, lower alkoxycarbonyl, sulfamoyl, lower alkylsulfamoyl, carbamoyl, lower alkylcarbamoyl, trifluoromethyl, or nitro;

$R^3$ is hydrogen, halogen, cyano or nitro;

$R^6$ is cyano, nitro, aryl, lower alkanoyl, aroyl, lower alkoxycarbonyl, lower hydroxyalkoxycarbonyl, lower alkoxy-lower-alkoxycarbonyl, or the group —CONR$^{4'}$R$^{5'}$ in which R$^{4'}$ individually is hydrogen, lower alkyl, cyclohexyl, lower alkylcyclohexyl, cyclohexylmethyl, lower alkylcyclohexylmethyl, lower hydroxyalkylcyclohexylmethyl, aryl-lower-alkyl, or aryl; R$^{5'}$ individually is hydrogen or lower alkyl; and R$^{4'}$ and R$^{5'}$ in combination are pentamethylene or ethyleneoxyethylene;

$R^5$ is hydrogen, lower alkyl, lower alkoxy, aryl-lower-alkyl or aryl;

$R^4$ is lower alkyl, halogen, thiocyanato, arylazo, or a group which $R^1$ can represent;

$R^7$ is hydrogen, lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl;

$R^8$ is hydrogen, lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl;

$R^9$ and $R^{10}$ are fluorinated ester groups as defined above by —Z—O—R;

$R^{12}$ is hydrogen, cyano, or lower alkyl;

$R^{13}$ is cyano, carbamoyl, nitro, or lower alkoxycarbonyl;

$R^{14}$ is hydrogen, lower alkyl, phenyl, phenyl substituted with halogen, lower alkyl, lower alkoxy, lower alkanoylamino, cyano, or lower alkoxycarbonyl, lower alkylsulfonyl, phenylsulfonyl, phenylsulfonyl substituted with halogen, lower alkyl, lower alkoxy, lower alkanoylamino, cyano, or lower alkoxycarbonyl; and m is 1 or 2.

The couplers C' useful in the present invention have the formulae

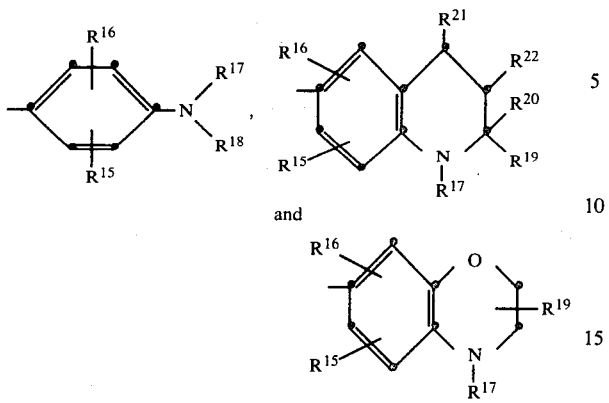

wherein

R$^{15}$ and R$^{16}$ are each selected from hydrogen, fluorine, chlorine, bromine, lower alkyl, cycloalkyl, lower alkoxy, trifluoromethyl, phenoxy, lower alkylthio, arylthio, and radicals having the formula —NH—X'—R$^{23}$ in which X' is —CO—, —COO—, or —SO$_2$— and R$^{23}$ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X' is —CO—, R$^{23}$ also can be hydrogen, amino, lower alkylamino, lower alkylcarbamoyl, lower dialkylamino, arylamino, aryl, furfuryl, or furyl;

R$^{17}$ and R$^{18}$ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; straight or branched alkyl of 1-8 carbons and such alkyl substituted with 1-3 of the following: hydroxy; halogen; cyano; succinimido; glutarimido; phthalimido; 2-pyrrolidono; benzothiazolyl; cyclohexyl; phenyl or phenyl substituted with lower alkyl, lower alkoxy, halogen, lower alkanoylamino, cyano or lower alkoxycarbonyl; lower alkanoylamino; sulfamoyl; lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkanoyloxy; lower alkoxycarbonyloxy; lower alkenylcarbonylamino; groups of the formula

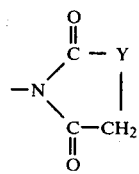

wherein Y is —NH—,

—O—, —S—, or —CH$_2$O—; —S—R$^{24}$ wherein R$^{24}$ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, triazolyl, or

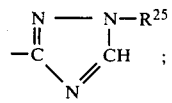

—SO$_2$R$^{23}$; —COOR$^{23}$; —OX'R$^{23}$; —NH—X'—R$^{23}$; —X'—R$^{23}$; —OCO—R$^{23}$; —CONR$^{25}$R$^{25}$; —SO$_2$NR$^{25}$R$^{25}$; wherein R$^{23}$ and X' are as defined above and each R$^{25}$ is selected from H and R$^{23}$; lower alkoxy; lower alkoxy substituted with hydroxy, cyano, lower alkanoyloxy, or lower alkoxy; phenoxy; phenoxy substituted with one or more of lower alkyl, lowr alkoxy or halogen; or R$^{17}$ and R$^{18}$ can be a single, combined group such as pentamethylene, ethyleneoxyethylene and ethylenesulfonylethylene which, with the nitrogen atom to which it is attached, forms a ring;

R$^{19}$, R$^{20}$, R$^{21}$ and R$^{22}$ are each selected from hydrogen and lower alkyl. The term "lower" are used herein means 1-6 carbons.

The couplers are prepared by procedures well known in the art and such couplers are disclosed in general in the patent literature, e.g., U.S. Pat. Nos. 2,805,218; 2,827,450; and 2,839,523.

In general the dyes of this invention are more bathochromic than the corresponding dyes where the fluorine atoms are replaced by hydrogen atoms, they sublime more readily than their hydrogen analogues, brighter shades are obtained when the dyes are heat transfer printed or dyed on the fibre, and are quite stable even at the temperatures used in the heat transfer printing process (200°–210° C.). They are also stable to the hydrolytic conditions used in the exhaust dyeing process. The corresponding hydrogen analogues are unstable even at room temperature and are isolated only with difficulty.

The present dyes are made up into a printing ink formulation or an aqueous dispersion by conventional methods. For example, a printing ink formulation is prepared by ball milling the dye with ethyl cellulose binder in ethanol for twentyfour hours. An aqueous dispersion for exhaust dyeing is prepared, for example, by ball milling the dye with REAX 80 C (anionic dispersing agent) and water until proper dispersion is achieved.

The following examples will further illustrate the invention.

EXAMPLE 1

Sodium nitrite (0.48 g) was added to concentrated sulphuric acid (3.5 ml) and the solution heated to 70° C. for five minutes. Propionic acid-acetic acid (1:5) (7 ml) was added at below 20° C. The mixture was cooled to 0° C. and 4-amino-3,5-dibromo hexafluoroisopropyl phenyl sulphonate (3.2 g) was added followed by a further 7 ml of 1:5 acid. The mixture was diazotised for one hour at 0°-5° C. and then added to N,N-diethyl m-toluidine (1.6 g) in ethanol with sodium acetate present. After twenty minutes the mixture was added to cold water and the dibromo dye precipitated as a sticky solid. The crude dye was dissolved in dimethylformamide (50 ml) and stirred at 110° C. with cuprous cyanide (2.5 g) for three hours. The mixture was poured into cold water and the solid filtered off and extracted with hot ethyl acetate. The ethyl acetate extract was concentrated to dryness and the residue slurried with warm isopropanol to give 2.5 g of the final dye product.

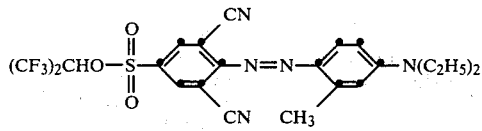

EXAMPLE 2

By the above procedure 4-amino-3,5-dibromohexafluoroisopropyl phenylsulfonate was diazotised and coupled to N,N-diethyl-2-methoxy-5-trifluoroacetamido aniline and the cyanide displacement reaction carried out to give the greenish-blue dicyano dye.

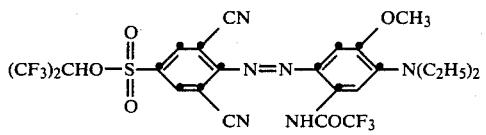

EXAMPLE 3

Using the above procedure 2-aminothiophene-3,5-bissulphonic acid bis-hexafluoro-isopropyl ester was diazotised and coupled to N-ethyl-2,2,4,7-tetramethyl-1,2,3,4-tetrahydroquinoline to give the blue dye.

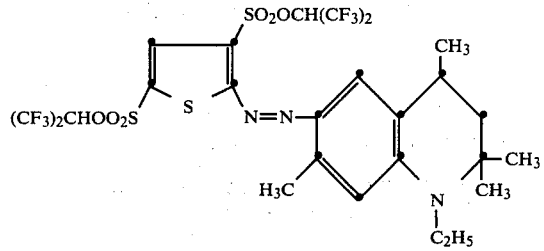

The dyes from Examples 1-3 were applied by both the heat transfer printing process and by exhaust dyeing to polyester and nylon. Bright blue prints and dyeings were obtained which were of good strength and had good fastness properties. The dyes had particularly good properties on polyester fibres and especially good lightfastness. They were surprisingly bathochromic in shade compared to the hydrogen analogues.

The dyes for Examples 1-3 also were used to prepare inks by the following procedure. A sample of each dye was ball-milled in ethanol: ethylene glycol (9:1 by volume) with ethyl cellulose thickener for 48 hours. The resulting ink was applied to pieces of flexographic paper by roller coating and allowed to dry. Pieces of the paper were then used for transfer printing onto nylon fabric at 200° C. for 30 seconds, and onto polyester fabric at 210° C. for 30 seconds. Bright blue prints were obtained which were of good strength and had good fastness properties.

These dyes also were applied by exhaust dyeing as follows. An amount of 0.1 g of the dye was dissolved in 10 ml of 2-methoxyethanol. A small amount (3 to 5 ml) of a 3% sodium lignin sulphonate aqueous solution was added, with stirring and then the volume of the batch was brought to 300 ml with water. 3 ml of an anionic solvent carrier (Tanavol) was added to the bath and 10 g of a textile fabric (polyester) was placed in the bath and worked 10 minutes without heat. The dyeing was then carried out at the boil for 1 hour. The dyed fabric was removed from the dyebath and scoured for 20 minutes at 80° C. in a solution containing 1 g/liter neutral soap and 1 g/liter sodium carbonate. The fabric was then rinsed, dried in an oven at 121° C. and heat set (for the removal of residual carrier) for 5 minutes at 177° C. The fabric was dyed a bright shade of blue. The prints and dyeings from both the heat transfer process and the exhaust dyeing process were of good strength and had good fastness properties. The dyes had particularly good properties on polyester fibres and especially good light fastness. They were surprisingly bathochromic in shade compared to the hydrogen analogues.

The following tables illustrate dyes of the present invention.

TABLE 1

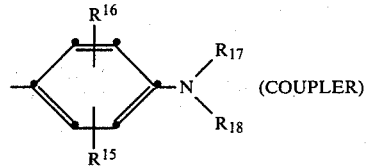

| Ex. | Diazo Moiety | Substituents | $R^{15}$ | $R^{16}$ | $R^{17}$ | $R^{18}$ |
|---|---|---|---|---|---|---|
| 4 | A | 2,6-dicyano-4-$(CF_3)_2CHO$—$SO_2$— | —$NHCOCH_3$ | —H | —$CH_2CH_3$ | —$CH_2CH_2OCOCH_3$ |
| 5 | " | 2,6-dicyano-4-$CF_3CH_2OSO_2$— | " | " | " | " |
| 6 | " | 2,6-dicyano-4-$CF_3CF_2CH_2OSO_2$— | " | " | " | " |
| 7 | " | 2,6-dicyano-4-$(CF_3)_2CHOCO$— | " | " | " | " |
| 8 | " | 2,6-dicyano-4-$CF_3CH_2OCO$— | " | " | " | " |

TABLE 1-continued

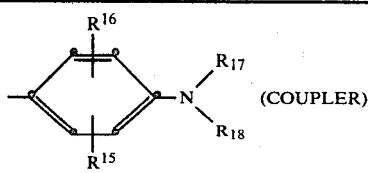
(COUPLER)

| Ex. | Diazo Moiety | Substituents | $R^{15}$ | $R^{16}$ | $R^{17}$ | $R^{18}$ |
|---|---|---|---|---|---|---|
| 9 | " | 2,6-dicyano-4-$CF_3CF_2CH_2OCO-$ | " | " | " | " |
| 10 | " | 2,6-dicyano-4-$(CF_3)_2CHO-SO_2-$ | " | $-OCH_3$ | " | $-CH_2CH_2CN$ |
| 11 | " | " | H | " | $-CH_2CH_2OCOCH_3$ | $-CH_2CH_2OCOCH_3$ |
| 12 | " | 2,6-dinitro-4-$(CF_3)_2CHO-SO_2-$ | $-NHCOCH_3$ | H | $-CH_2CH_2CN$ | $-CH_2CH_2OH$ |
| 13 | " | 2,6-dinitro-4-$(CF_3)_2CHOCO-$ | " | " | " | $-CH_2CH_2OCOCH_3$ |
| 14 | " | 2,6-dicyano-4-$(CF_3)_2CHOCO-$ | " | " | " | $-CH_2CH_2CN$ |
| 15 | " | 2-cyano-4-$(CF_3)_2CHO-SO_2-$ | " | " | $-CH_2CH_3$ | $-CH_2CH_2OH$ |
| 16 | " | " | " | " | " | $-CH_2CH_2-N\begin{matrix}O\\ \\O\end{matrix}$ |
| 17 | B | 3,5-bis-$(CF_3)_2CHO-SO_2-$ | " | " | $-CH_2CH_2CN$ | $-CH_2CH_2OCOC_6H_5$ |
| 18 | " | 3,5-bis-$CF_3CH_2OSO_2-$ | " | " | " | " |
| 19 | " | 3,5-bis-$CF_3CF_2CH_2OSO_2-$ | " | " | " | " |
| 20 | " | 3,5-bis-$CF_3CH_2OCO-$ | " | " | " | " |
| 21 | " | 3,5-bis-$CF_3CF_2CH_2OCO-$ | " | " | " | " |
| 22 | " | 3-nitro-5-$(CF_3)_2CHOSO_2-$ | " | " | " | " |
| 23 | " | 3-nitro-5-$CF_3CH_2OSO_2-$ | " | " | " | " |
| 24 | " | 3-nitro-5-$(CF_3)_2CHOCO-$ | " | " | " | " |
| 25 | " | 3-nitro-5-$(CF_3)_2CHOCO-$ | " | " | " | " |
| 26 | " | 3-$(CF_3)_2CHOSO_2-$5-$NO_2-$ | " | " | " | " |
| 27 | " | 3-$(CF_3)_2CHOCO-$5-$NO_2-$ | " | " | " | " |
| 28 | " | 3,5-bis-$(CF_3)_2CHOCO-$ | " | " | " | $-CH_2CH_2CH_2CH_3$ |
| 29 | " | " | " | " | $-CH_2CH_3$ | $-CH_2C_6H_5$ |
| 30 | " | " | " | " | $-C_6H_{11}$ | $-CH_2CHCH_2OH$<br>\|<br>OH |
| 31 | " | " | " | " | " | $-CH_2CH_2OH$ |
| 32 | I | 3-$(CF_3)_2CHO-SO_2-$ | " | " | " | $-CH_2CH_3$ |
| 33 | " | 3-$(CF_3)_2CHOCO-$ | " | " | $-CH_2CH_3$ | " |
| 34 | C | 5-$(CF_3)_2CHO-SO_2-$ | " | " | $-CH_2CH_2OCH_3$ | $-CH_2CH_2\overset{O}{\overset{\|}{C}}CH_3$ |
| 35 | " | 6-$(CF_3)_2CHOSO_2-$ | " | " | " | " |
| 36 | " | 6-$CF_3CH_2OSO_2-$ | " | " | " | " |
| 37 | " | 6-$(CF_3)_2CHOCO-$ | " | " | " | " |
| 38 | " | 6-$CF_3CH_2OCO-$ | " | " | " | " |
| 39 | " | 6-$CF_3CF_2CH_2OCO-$ | " | " | " | " |
| 40 | " | 5-$(CF_3)_2CHOCO-$ | $-CH_3$ | " | $-CH_2CH_2OH$ | $-CH_2CH_2OH$ |
| 41 | " | " | " | " | " | $-CH_2CH_3$ |
| 42 | " | " | " | " | $-CH_2CH_2OCOCH_3$ | $-CH_2CH_2OCOCH_3$ |
| 43 | " | " | " | " | $-CH_2CH_3$ | $-CH_2CHCH_2OH$<br>\|<br>OH |
| 44 | " | " | " | " | " | $-CH_2CH_2CN$ |
| 45 | C | 5-$(CF_3)_2CHO-SO_2-$ | " | " | " | $-CH_2CH_2Cl$ |
| 46 | " | 5-$(CF_3)_2CHOSO_2-$ | " | " | " | " |
| 47 | " | 5-$(CF_3)_2CHOCO-$ | " | " | " | " |
| 48 | " | 5-$CF_3CH_2OCO-$ | " | " | " | " |
| 49 | " | 5-$(CF_3)_2CHOCO-$ | " | " | " | $-CH_2CH_2OCOCH_3$ |
| 50 | " | " | " | " | $-CH_2CH_2SO_2CH_2CH_2$ | |
| 51 | " | " | $-NHCOCH_3$ | " | $-CH_2CH_3$ | $-CH_2CH_3$ |
| 52 | " | " | " | " | " | $-CH_2CH_2CN$ |
| 53 | D | 6-$(CF_3)_2CHO-SO_2-$ | " | " | $-CH_2CH_2OCOCH_3$ | $-CH_2CH_2OCOCH_3$ |
| 54 | " | 6-$CF_3CH_2OSO_2-$ | " | " | " | " |
| 55 | " | 6-$CF_3CH_2OCO-$ | " | " | " | " |
| 56 | " | 5-$(CF_3)_2CHOSO_2-$ | " | " | " | " |
| 57 | " | 5-$CF_3CH_2OCO-$ | " | " | " | " |
| 58 | " | 5-Cl—6-$(CF_3)_2CHOSO_2$ | " | " | " | " |
| 59 | " | 6-$(CF_3)_2CHOCO-$ | " | $-CH_3$ | $-H$ | $-CH_2CH_2CN$ |
| 60 | " | " | " | " | " | $-CH(CH_3)CH_2CH_3$ |
| 61 | " | " | H | $-OCH_3$ | H | ![thiophene] |
| 62 | " | " | $-CH_3$ | H | $-CH_2CH_3$ | $-CH_2CH_2SO_2NH_2$ |

TABLE 1-continued $$\text{—} \underset{R^{15}}{\overset{R^{16}}{\bigcirc}} \text{—N} \overset{R_{17}}{\underset{R_{18}}{}} \quad \text{(COUPLER)}$$

| Ex. | Diazo Moiety | Substituents | $R^{15}$ | $R^{16}$ | $R^{17}$ | $R^{18}$ |
|---|---|---|---|---|---|---|
| 63 | H | 4-(CF₃)₂CHO—SO₂— | —NHCOCH₃ | H | H | —CH₂—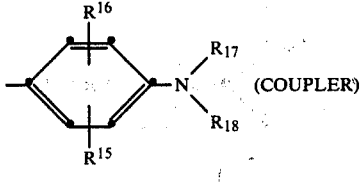 |
| 64 | " | 4-CF₃CH₂OSO₂ | " | " | " | " |
| 65 | " | 4-CF₃CH₂OCO— | " | " | " | " |
| 66 | " | 4-(CF₃)₂CHOCO— | " | " | " | —CH₂CH₂OCH₃ |
| 67 | " | " | " | " | " | —CH₂CH₃ \| CH₂CO₂CH₂CH₃ |
| 68 | E | 4-(CF₃)₂CHO—SO₂— | " | " | " | —CH—CH₂CH(CH₃)₂ \| CH₂CH(CH₃)₂ |
| 69 | " | 5-(CF₃)₂CHOSO₂— | " | " | " | " |
| 70 | " | 5-CF₃CH₂OSO₂— | " | " | " | " |
| 71 | " | 5-(CF₃)₂CHOCO— | " | " | " | " |
| 72 | " | 5-CF₃CH₂OCO— | " | " | " | " |
| 73 | " | 4-(CF₃)₂CHOCO— | " | " | " | —CH₂(CH)ₙCH₂OH \| OH |
| 74 | " | " | " | " | " | —CH(CH₃)—CH₂CH₃ |
| 75 | A | 2,6-dicyano-4-(CF₃)₂CHO—SO₂— | H | CH₃ | " | 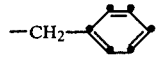 |
| 76 | " | 2,6-dicyano-4-(CF₃)₂CHOCO— | H | H | H | —CH₂CH₂CN |
| 77 | " | 2,6-dinitro-4-(CF₃)₂CHOCO— | " | " | —CH₃ | —CH₃ |
| 78 | " | " | " | " | —CH₂CH₃ | —CH₂CH₃ |
| 79 | " | " | " | " | " | —CH₂C₆H₅ |
| 80 | " | " | " | " | " | —C₆H₁₁ |
| 81 | " | " | " | " | " | —CH₂CH₂OH |
| 82 | F | 3-(CF₃)₂CHO—SO₂— | " | " | " | —CH₂CH₂OCOCH₃ |
| 83 | " | 4-(CF₃)₂CHOSO₂—3-chloro | " | " | " | " |
| 84 | " | 4-CF₃CH₂OSO₂—3-chloro | " | " | " | " |
| 85 | " | 3-(CF₃)₂CHOCO— | " | " | " | —CH₂CH(OH)CH₂OH |
| 86 | " | " | " | " | " | —CH₂CH₃CN |
| 87 | " | " | " | " | —CH₂CH₃CN | " |
| 88 | " | " | " | " | " | —CH₂CH₂OH |
| 89 | " | " | " | " | " | —CH₂CH₂OCOCH₃ |
| 90 | B | 3,5-bis-(CF₃)₂CHO—SO₂— | " | " | " | —CH₂CH₂OCOC₆H₅ |
| 91 | " | 3,5-bis-(CF₃)₂CHOCO— | " | " | —CH₂CH₂OH | —CH₂CH₂OH |
| 92 | " | " | " | " | —CH₂CH₂OCOCH₃ | —CH₂CH₂OCOCH₃ |
| 93 | " | " | " | " | —CH₂CH₂SO₂CH₂CH₂— | |
| 94 | G | 5-(CF₃)₂CHO—SO₂— | Cl | Cl | H | —CH₂CH₂CN |
| 95 | " | 5-(CF₃)₂CHOCO— | CH₃ | H | CH₂CH₃ | —CH₂CH—CH₂OCCH₃ \|\| O \| OCCH₃ \|\| O |
| 96 | C | 5-(CF₃)₂CHO—SO₂— | CH₃ | H | " | —CH₂CH₃ |
| 97 | " | 5-(CF₃)₂CHOCO— | " | " | " | —CH₂CH₂OH |
| 98 | " | " | " | " | " | —CH₂CH₂NH₂ |
| 99 | H | 4-(CF₃)₂CHO—SO₂ | " | " | CH₂CH₃ | " |
| 100 | " | 4-(CF₃)₂CHOCO— | " | " | CH₂CH₂CN | " |
| 101 | " | " | —NHCOCH₃ | " | CH₂CH₃ | —CH₂CH₃ |
| 102 | " | " | " | " | " | —CH₂CH₂OCOCH₃ |
| 103 | " | " | " | " | " | —(CH₂CH₂O)₂CH₂CH₃ |
| 104 | D | 6-(CF₃)₂CHO—SO₂— | —NHCOC₆H₅ | " | " | —CH₂CH₂CONH₂ |
| 105 | " | 6-(CF₃)₂CHOCO— | " | CH₃ | H | —CH₂CH₃ |
| 106 | " | " | —NHCOCH₃ | OCH₃ | CH₂CH₃ | " |
| 107 | " | " | " | " | " | —CH₂CH₃OCOCH₃ |
| 108 | I | 3-(CF₃)₂CHO—SO₂— | " | " | " | —CH₂CH(OH)CH₃ |
| 109 | " | 3-CF₃CH₂OSO₂— | " | " | " | " |
| 110 | " | 3-CF₃CH₂OCO— | " | " | " | " |
| 111 | " | 3-(CF₃)₂CHOCO— | " | " | CH₂CH₂OH | —CH₂CH₂OH |
| 112 | " | " | " | " | CH₂CH₂OCOCH₃ | —CH₂CH₂OCOCH₃ |
| 113 | " | " | " | " | CH₂CH₃ |  |

TABLE 1-continued

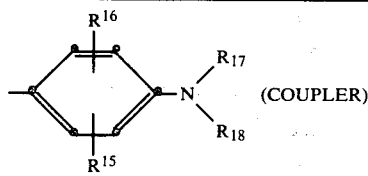
(COUPLER)

| Ex. | Diazo Moiety | Substituents | $R^{15}$ | $R^{16}$ | $R^{17}$ | $R^{18}$ |
|---|---|---|---|---|---|---|
| 114 | " | " | " | " | $CH_2CH_3$ | $-CH_2CH_2O\overset{O}{\underset{\|}{C}}NH-\!\!\!\diagup\!\!\!\!\bigcirc$ |
| 115 | " | " | " | " | " | $-CH_2CH_2-\underset{S}{\overset{N}{\diagdown}}\!\!\!\!\diagup\!\!\!\!\bigcirc$ |

TABLE II

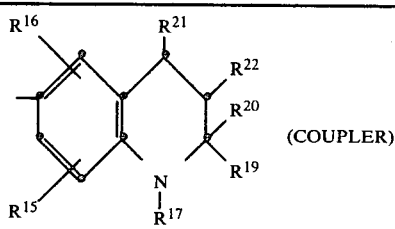
(COUPLER)

| Ex. | Diazo Moiety | Substituents | $R^{15}, R^{16}, R^{19}, R^{20}, R^{21}, R^{22}$ | $R^{17}$ |
|---|---|---|---|---|
| 116 | A | 2,6-dicyano-4-$(CF_3)_3$CHO—$SO_2$— | 2,7-di-$CH_3$ | —$C_2H_4OH$ |
| 117 | " | 2,6-dicyano-4-$CF_3CH_2OSO_2$— | " | " |
| 118 | " | 2,6-dicyano-4-$CF_3CF_2CH_2OSO_2$— | " | " |
| 119 | " | 2,6-dicyano-4-$(CF_3)_2$CHOCO— | " | " |
| 120 | " | 2,6-dicyano-4-$CF_3CH_2OCO$— | " | " |
| 121 | " | 2,6-dicyano-4-$CF_3CF_2CH_2OCO$— | " | " |
| 122 | " | 2,6-dicyano-4-$(CF_3)_2$CHOCO— | 2,5-di-$CH_3$—8-$OCH_3$ | —$CH_2CH(OH)CH_2OH$ |
| 123 | " | 2,6-dinitro-4-$(CF_3)_2$CHOCO— | 2,2,4,7-tetra-$CH_3$ | —$C_2H_4CONH_2$ |
| 124 | " | " | 2,2,4-tri-$CH_3$ | —$C_2H_4NHCOCH_3$ |
| 125 | I | 3-$(CF_3)_2$CHO—$SO_2$— | 2-$CH_3$—7-$NHCOCH_3$ | —$C_2H_4CN$ |
| 126 | " | " | " | " |
| 127 | " | 3-$CF_3CH_2OCO$ | " | " |
| 128 | " | 3-$(CF_3)_2$CHCO— | 2,2,4-tri-$CH_3$—7-$NHCOCH_3$ | —$C_2H_4Cl$ |
| 129 | " | " | 2,-$CH(CH_3)_2$—7-$NHCOCH_3$ | —$C_2H_4OOCCH_3$ |
| 130 | " | " | 7-$CH_3$ | —$C_2H_4OC_2H_5$ |
| 131 | B | 3,5-bis-$(CF_3)_2$CHO—$SO_2$— | 3-CN—7-$CH_3$ | —$C_2H_4CONHC_2H_5$ |
| 132 | " | 3,5-bis-$CF_3CH_2OSO_2$— | " | " |
| 133 | " | 3,5-bis-$CF_3CF_2CH_2OSO_2$— | " | " |
| 134 | " | 3,5-bis-$CF_3CH_2OCO$— | " | " |
| 135 | " | 3,5-bis-$CF_3CF_2CH_2OCO$— | " | " |
| 136 | " | 3-nitro-5-$(CF_3)_2$CHOSO_2— | " | " |
| 137 | " | 3-nitro-5-$CF_3CH_2OSO_2$— | " | " |
| 138 | " | 3-nitro-5-$(CF_3)_2$CHOCO— | " | " |
| 139 | " | 3-nitro-5-$(CF_3)_2$CHOCO— | " | " |
| 140 | " | 3-$(CF_3)_2$CHOSO_2—5-$NO_2$— | " | " |
| 141 | " | 3-$(CF_3)_2$CHOCO—5-$NO_2$— | " | " |
| 142 | " | 3,5-bis-$(CF_3)_2$CHOCO— | 3-$CONH_2$—7-$CH_3$ | —$C_2H_4CONHC_2H_5$ |
| 143 | " | " | 3-Cl—7-$CH_3$ | —$C_2H_4CONHCH_2C_6H_5$ |
| 144 | " | " | 3-$OCH_3$—7-$CH_3$ | —$C_2H_4OOCOC_2H_5$ |
| 145 | " | " | 2,2,4-di-$CH_3$—5,8-di-$OCH_3$ | —$C_2H_4NHCOCH=CH_2$ |
| 146 | H | 4-$(CF_3)_2$CHO—$SO_2$— | 2,2,4-tri-$CH_3$—8-$OCH_3$ | —$CH_2C_6H_5$ |
| 147 | " | 4-$CF_3CH_2OSO_2$— | " | " |
| 148 | " | 4-$CF_3CH_2OCO$— | " | " |
| 149 | " | 4-$(CF_3)_2$CHOCO— | 2-$CH_3$—7-$NHCOCH_3$ | —$C_2H_4CONHCH_2OH$ |
| 150 | " | " | 3-OH—7-$CH_3$ | —$C_3H_6NHCONHC_2H_5$ |
| 151 | " | " | 2,7-di-$CH_3$ | —$C_2H_5$ |
| 152 | C | 5-$(CF_3)_2$CHO—$SO_2$— | 2,5-di-$CH_3$—8-$OCH_3$ | —$C_2H_4SO_2NH_2$ |
| 153 | " | 6-$(CF_3)_2$CHOSO_2— | " | " |
| 154 | " | 6-$CF_3CH_2OSO_2$— | " | " |
| 155 | " | 6-$(CF_3)_2$CHOCO— | " | " |
| 156 | " | 6-$CF_3CH_2OCO$— | " | " |
| 157 | " | 6-$CF_3CF_2CH_2OCO$— | " | " |
| 158 | " | 5-$(CF_3)_2$CHOCO— | 2,2,4,7-tetra-$CH_3$ | —$C_2H_4SO_2NHC_2H_5$ |
| 159 | " | " | 2,2,4-tri-$CH_3$ | —$C_2H_4SCH_3$ |

TABLE II-continued

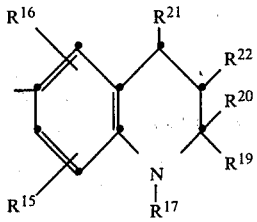

(COUPLER)

| Ex. | Diazo Moiety | Substituents | $R^{15}, R^{16}, R^{19}, R^{20}, R^{21}, R^{22}$ | $R^{17}$ |
|---|---|---|---|---|
| 160 | C | 5-$(CF_3)_2$CHO—$SO_2$— | 2-$CH_3$—7-NHCOCH$_3$ | 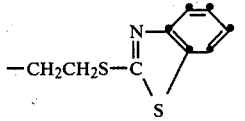 |
| 161 | D | 6-$(CF_3)_2$CHO—$SO_2$— | 2,2,4-tri-$CH_3$—7-NHCOCH$_3$ | 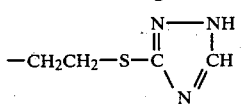 |
| 162 | " | 6-$CF_3CH_2OSO_2$— | " | " |
| 163 | " | 6-$CF_3CH_2OCO$— | " | " |
| 164 | " | 5-$(CF_3)_2$CHOSO$_2$— | " | " |
| 165 | " | 5-$CF_3CH_2OCO$— | " | " |
| 166 | " | 5-Cl—6-$(CF_3)_2$CHOSO$_2$— | " | " |
| 167 | " | 6-$(CF_3)_2$CHOCO— | 2-CH(CH$_3$)$_2$—7-NHCOCH$_3$ | 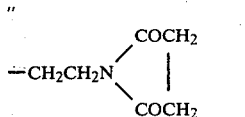 |
| 168 | " | " | 7-CH$_3$ | —C$_2$H$_4$O—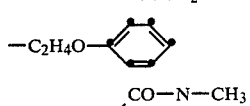 |
| 169 | F | 3-$(CF_3)_2$CHO—SO$_2$— | 3-CN—7-CH$_3$ | 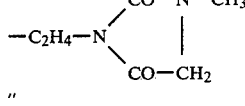 |
| 170 | " | 4-$(CF_3)_2$CHOSO$_2$—3-chloro | " | " |
| 171 | " | 4-$CF_3CH_2OSO_2$—3-chloro | " | " |
| 172 | " | 3-$(CF_3)_2$CHOCO— | 3-CONH$_2$—7-CH$_3$ | —CH$_2$CHCH$_2$OH<br>   \|<br>   OH |
| 173 | A | 2,6-dicyano-4-$(CF_3)_2$CHO—SO$_2$— | 3-Cl—7-CH$_3$ | 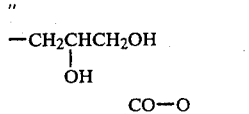 |
| 174 | E | 4-$(CF_3)_2$CHO—SO$_2$— | 3-OCH$_3$—7-CH$_3$ | 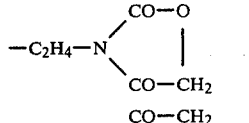 |
| 175 | " | 5-$(CF_3)_2$CHOSO$_2$— | " | " |
| 176 | " | 5-$CF_3CH_2OSO_2$— | " | " |
| 177 | " | 5-$(CF_3)_2$CHOCO— | " | " |
| 178 | " | 5-$CF_3CH_2OCO$— | " | " |
| 179 | " | 4-$(CF_3)_2$CHOCO— | 2,2,4-di-CH$_3$—5,8-di-OCH$_3$ | 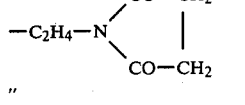 |
| 180 | B | 3,5-bis-$(CF_3)_2$CHO—SO$_2$— | 2,2,4-tri-CH$_3$—8-OCH$_3$ | 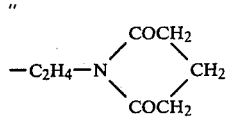 |
| 181 | " | 3,5-bis-$(CF_3)_2$CHOCO— | 2-CH$_3$—7-NHCOCH$_3$ | 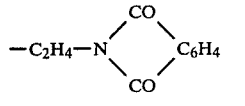 |
| 182 | F | 3-$(CF_3)_2$CHO—SO$_2$— | 3-OH—7-CH$_3$ | 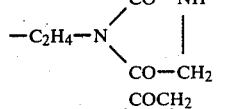 |

TABLE II-continued

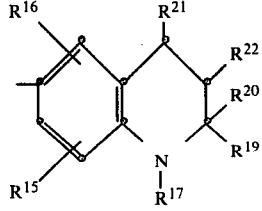

(COUPLER)

| Ex. | Diazo Moiety | Substituents | $R^{15}, R^{16}, R^{19}, R^{20}, R^{21}, R^{22}$ | $R^{17}$ |
|---|---|---|---|---|
| 183 | C | 5-$(CF_3)_2$CHO—$SO_2$— | 2,7-di-$CH_3$ | —$C_2H_4$—N(CO)(SO_2)-(2,3-dimethylphenyl ring) |
| 184 | G | 5-$(CF_3)_2$CHO—$SO_2$— | 2,5-di-$CH_3$—8-$OCH_3$ | —$C_2H_4$—N(CO—S)(CO—$CH_2$) |
| 185 | " | 5-$(CF_3)_2$CHO$SO_2$— | " | " |
| 186 | " | 5-$(CF_3)_2$CHOCO— | " | " |
| 187 | " | 5-$CF_3CH_2$OCO— | " | " |
| 188 | " | 5-$(CF_3)_2$CHOCO— | 2,2,4,7-tetra-$CH_3$ | —$C_2H_4$—S—C(=N—N$C_2H_4$CN)(—CH=N) |
| 189 | " | " | 2,2,4-tri-$CH_3$ | —$C_2H_4$—N(CO—$CH_2$)($CH_2$—$CH_2$) |
| 190 | H | 4-$(CF_3)_2$CHO—$SO_2$— | 2-$CH_3$—7-$NHCOCH_3$ | —$C_2H_4$NHCO-phenyl |
| 191 | D | 6-$(CF_3)_2$CHO—$SO_2$— | 2,2,4-tri-$CH_3$—7-$NHCOCH_3$ | —$C_2H_4$NHCO-phenyl-$OCH_3$ |
| 192 | " | 6-$(CF_3)_2$CHOCO— | 2-$CH(CH_3)_2$—7-$NHCOCH_3$ | —$CH_2CH_2$—S—C(=N—NH)(—CH=N) |
| 193 | I | 3-$(CF_3)_2$CHO—$SO_2$— | 7-$CH_3$ | —$CH_2CH_2$—N(CO)($CH_2$)-(methylphenyl ring) |
| 194 | " | 3-$(CF_3)_2$CHOCO— | 3-CN—7-$CH_3$ | —$C_2H_4$OH |
| 195 | " | " | 3-$CONH_2$—7-$CH_3$ | —$CH_2CH_2$—N(CO)(SO_2)-(methylphenyl ring) |
| 196 | " | " | 2,2,4,7-tetra-$CH_3$ | —$CH_2CH_2$OCNH-phenyl |
| 197 | " | " | 2,2,4,7-tetra-$CH_3$ | —$CH_2CH_2$N(phthalimide) |

TABLE III $$R^{16}, R^{15} - \text{benzene ring} - O - R^{19} \text{ (COUPLER)}, N-R^{17}$$

| Ex. | Diazo Moiety | Substituents | $R^{15}, R^{16}, R^{19}$ | $R^{17}$ |
|---|---|---|---|---|
| 198 | A | 2,6-dicyano-4-$(CF_3)_2$CHO—$SO_2$— | 3,6-di-$CH_3$ | —$C_2H_4OH$ |
| 199 | " | 2,6-dicyano-4-$CF_3CH_2OSO_2$— | " | " |
| 200 | " | 2,6-dicyano-4-$CF_3CF_2CH_2OSO_2$— | " | " |
| 201 | " | 2,6-dicyano-4-$(CF_3)_2$CHOCO— | " | " |
| 202 | " | 2,6-dicyano-4-$CF_3CH_2OCO$— | " | " |
| 203 | " | 2,6-dicyano-4-$CF_3CF_2CH_2OCO$— | " | " |
| 204 | " | 2,6-dicyano-4-$(CF_3)_2$CHOCO— | 3-$CH_3$ | —$CH_2CH(OH)CH_2OH$ |
| 205 | " | 2,6-dinitro-4-$(CF_3)_2$CHOCO— | 3-$CH_3$—6-$NHCOCH_3$ | —$C_2H_4CONH_2$ |
| 206 | " | " | 6-$NHCOCH_3$ | —$C_2H_4NHCOCH_3$ |
| 207 | I | 3-$(CF_3)_2$CHO—$SO_2$— | 3,6-di-$CH_3$ | —$C_2H_4CN$ |
| 208 | " | 3-$CF_3CH_2OSO_2$— | " | " |
| 209 | " | 3-$CF_3CH_2OCO$— | " | " |
| 210 | " | 3-$(CF_3)_2$CHOCO— | 3-$CH_3$ | —$C_2H_4Cl$ |
| 211 | " | " | 3-$CH_3$—6-$NHCOCH_3$ | —$C_2H_4OOCC_2H_5$ |
| 212 | " | " | 6-$NHCOCH_3$ | —$C_2H_4OC_2H_5$ |
| 213 | B | 3,5-bis-$(CF_3)_2$CHO—$SO_2$— | 3,6-di-$CH_3$ | —$C_2H_4CONHC_2H_5$ |
| 214 | " | 3,5-bis-$CF_3CH_2OSO_2$— | " | " |
| 215 | " | 3,5-bis-$CF_3CF_2CH_2OSO_2$— | " | " |
| 216 | " | 3,5-bis-$CF_3CH_2OCO$— | " | " |
| 217 | " | 3,5-bis-$CF_3CF_2CH_2OCO$— | " | " |
| 218 | " | 3-nitro-5-$(CF_3)_2$CHOSO_2— | " | " |
| 219 | " | 3-nitro-5-$CF_3CH_2OSO_2$— | " | " |
| 220 | " | 3-nitro-5-$(CF_3)_2$CHOCO— | " | " |
| 221 | " | 3-nitro-5-$(CF_3)_2$CHOCO— | " | " |
| 222 | " | 3-$(CF_3)_2$CHOSO_2—5-$NO_2$— | " | " |
| 223 | " | 3-$(CF_3)_2$CHOCO—5-$NO_2$— | " | " |
| 224 | " | 3,5-bis-$(CF_3)_2$CHOCO— | 3-$CH_3$ | —$C_2H_4CONHC_2H_5$ |
| 225 | " | " | 3-$CH_3$—6-$NHCOCH_3$ | —$C_2H_4CONHCH_2C_6H_5$ |
| 226 | H | 4-$(CF_3)_2$CHO—$SO_2$— | 6-$NHCOCH_3$ | —$C_2H_4OOCOC_2H_5$ |
| 227 | " | 4-$CF_3CH_2OSO_2$— | " | " |
| 228 | " | 4-$CF_3CH_2OCO$— | " | " |
| 229 | " | 4-$(CF_3)_2$CHOCO— | 3,6-di-$CH_3$ | —$C_2H_4NHCOCH=CH_2$ |
| 230 | " | " | 3-$CH_3$ | —$CH_2C_6H_5$ |
| 231 | " | " | 3-$CH_3$—6-$NHCOCH_3$ | —$C_2H_4CONHCH_2OH$ |
| 232 | C | 5-$(CF_3)_2$CHO—$SO_2$— | 3,6-$NHCOCH_3$ | —$C_3H_6NHCONHC_2H_5$ |
| 233 | " | 6-$(CF_3)_2$CHOSO_2— | " | " |
| 234 | " | 6-$CF_3CH_2OSO_2$— | " | " |
| 235 | " | 6-$(CF_3)_2$CHOCO— | " | " |
| 236 | " | 6-$CF_3CH_2OCO$— | " | " |
| 237 | " | 6-$CF_3CF_2CH_2OCO$— | " | " |
| 238 | " | 5-$(CF_3)_2$CHOCO— | 3,6-di-$CH_3$ | —$C_2H_5$ |
| 239 | " | " | 3-$CH_3$ | —$C_2H_4SO_2NH_2$ |
| 240 | " | " | 3-$CH_3$—6-$NHCOCH_3$ | —$C_2H_4SO_2NHC_2H_5$ |
| 241 | G | 5-$(CF_3)_2$CHO—$SO_2$— | 6-$NHCOCH_3$ | —$C_2H_4SCH_3$ |
| 242 | " | 5-$(CF_3)_2$CHOCO— | 3,6-di-$CH_3$ | —$CH_2CH_2S$—(benzothiazol-2-yl) |
| 243 | D | 6-$(CF_3)_2$CHO—$SO_2$— | 3-$CH_3$ | —$CH_2CH_2$—S—(1,2,4-triazol-3-yl) |
| 244 | " | 6-$CF_3CH_2OSO_2$— | " | " |
| 245 | " | 6-$CF_3CH_2OCO$— | " | " |
| 246 | " | 5-$(CF_3)_2$CHOSO_2— | " | " |
| 247 | " | 5-$CF_3CH_2OCO$— | " | " |
| 248 | " | 5-Cl—6-$(CF_3)_2$CHOSO_2— | " | " |
| 249 | " | 6-$(CF_3)_2$CHOCO— | 3-$CH_3$—6-$NHCOCH_3$ | —$CH_2CH_2N$(COCH_2—COCH_2) (succinimide) |
| 250 | A | 2,6-dicyano-4-$(CF_3)_2$CHO—$SO_2$— | 6-$NHCOCH_3$ | —$C_2H_4O$—(furyl) |

TABLE III-continued

Structure: A benzene ring with substituents $R^{15}$, $R^{16}$, and an $-N(R^{17})-$ group attached to a coupler moiety containing $R^{19}$ and a carbonyl group. (COUPLER)

| Ex. | Diazo Moiety | Substituents | $R^{15}$, $R^{16}$, $R^{19}$ | $R^{17}$ |
|---|---|---|---|---|
| 251 | " | 2,6-dicyano-4-$(CF_3)_2CHOCO-$ | 3,6-di-$CH_3$ | $-C_2H_4-N$ (ring: CO—N—$CH_3$ / CO—$CH_2$) |
| 252 | " | 2,6-dinitro-4-$(CF_3)_2CHOCO-$ | 3-$CH_3$ | $-CH_2CHCH_2OH$ with OH |
| 253 | E | 4-$(CF_3)_2CHO-SO_2-$ | 3-$CH_3$—6-$NHCOCH_3$ | $-C_2H_4-N$ (ring: CO—O / CO—$CH_2$) |
| 254 | " | 5-$(CF_3)_2CHOSO_2-$ | " | " |
| 255 | " | 5-$CF_2CH_2OSO_2-$ | " | " |
| 256 | " | 5-$(CF_3)_2CHOCO-$ | " | " |
| 257 | " | 5-$CF_3CH_2OCO-$ | " | " |
| 258 | " | " | 6-$NHCOCH_3$ | $-C_2H_4-N$ (ring: CO—$CH_2$ / CO—$CH_2$) |
| 259 | B | 3,5-bis-$(CF_3)_2CHO-SO_2-$ | 3,6-di-$CH_3$ | $-C_2H_4-N$ (ring: $COCH_2$ / $CH_2$ / $COCH_2$) |
| 260 | " | 3-$(CF_3)_2CHO-SO_2-$ | 3-$CH_3$ | $-C_2H_4-N$ (ring: CO / $C_6H_4$ / CO) |
| 261 | " | 4-$(CF_3)_2CHOSO_2-$3-chloro | " | " |
| 262 | " | 4-$CF_3CH_2OSO_2-$3-chloro | " | " |
| 263 | " | 3-$(CF_3)_2CHOCO-$ | 3-$CH_3$—6-$NHCOCH_3$ | $-C_2H_4-N$ (ring: CO—NH / CO—$CH_2$) |
| 264 | C | 5-$(CF_3)_2CHO-SO_2-$ | 6-$NHCOCH_3$ | $-C_2H_4-N$ (ring: $COCH_2$ / O / $COCH_2$) |
| 265 | G | 5-$(CF_3)_2CHO-SO_2-$ | 3,6-di-$CH_3$ | $-C_2H_4-N$ (ring: CO / benzene ring / $SO_2$) |
| 266 | " | 5-$(CF_3)_2CHOSO_2-$ | " | " |
| 267 | " | 5-$(CF_3)_2CHOCO-$ | " | " |
| 268 | " | 5-$CF_3CH_2OCO-$ | " | " |
| 269 | " | 5-$(CF_3)_2CHOCO-$ | 3-$CH_3$ | $-C_2H_4-N$ (ring: CO—S / CO—$CH_2$) |
| 270 | " | " | 3-$CH_3$—6-$NHCOCH_3$ | $-C_2H_4-S-C$ (imidazole ring with $NC_2H_4CN$, CH, N) |
| 271 | H | 4-$(CF_3)_2CHO-SO_2-$ | 6-$NHCOCH_3$ | $-C_2H_4-N$ (ring: CO—$CH_2$ / $CH_2$—$CH_2$) |

TABLE III-continued

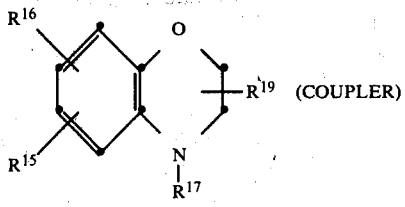 (COUPLER)

| Ex. | Diazo Moiety | Substituents | $R^{15}, R^{16}, R^{19}$ | $R^{17}$ |
|---|---|---|---|---|
| 272 | " | 4-$(CF_3)_2$CHOCO— | 3,6-di-$CH_3$ | 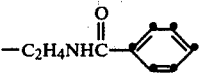 |
| 273 | " | " | 3-$CH_3$ | 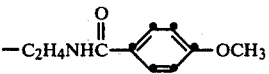 |
| 274 | I | 3-$(CF_3)_2$CHO—$SO_2$— | 3-$CH_3$—6-NHCOCH$_3$ | 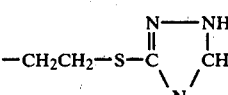 |
| 275 | " | 3-$(CF_3)_2$CHOCO— | 6-NHCOCH$_3$ | 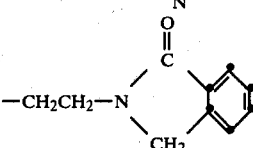 |
| 276 | " | " | 3,6-di-$CH_3$ | —$C_2H_4OH$ |
| 277 | " | " | 3-$CH_3$ | 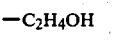 |
| 278 | " | " | 3,6-di-$CH_3$ | 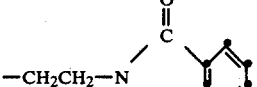 |
| 279 | " | " | 3,6-di-$CH_3$ | 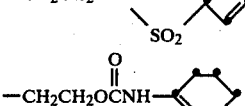 |

The invention has been described in detail with particular reference to preferred embodiments thereof, but it will be understood that variations and modifications can be effected within the spirit and scope of the invention.

I claim:

1. An azo compound of the structure X—N=N—C' wherein X is selected from

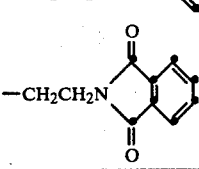

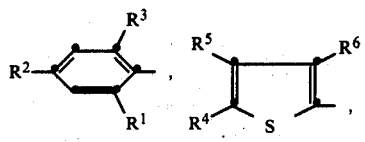

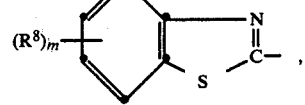

C

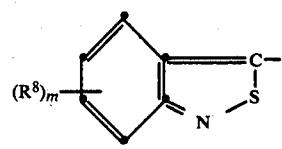

D

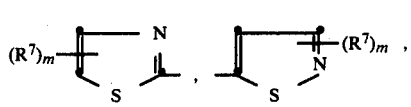

E        F

-continued

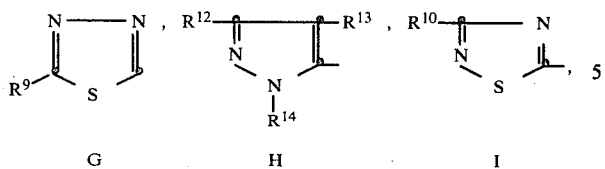

G  H  I wherein one or two substituents $R^1$ through $R^{13}$ on each radical is an ester group of the structure —Z—O—R wherein Z is either

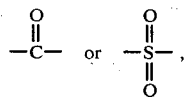

and R is a lower alkyl group, straight chain, branched chain or alicyclic, and which is substituted with 1–3 fluorine atoms;

$R^1$ is hydrogen, halogen, cyano, nitro, formyl, lower alkanoyl, benzoyl, lower alkoxycarbonyl, lower alkylsulfonyl, sulfamoyl, lower alkylsulfamoyl, carbamoyl, lower alkylcarbamoyl, or trifluoromethyl;

$R^2$ is halogen, cyano, lower alkylsulfonyl, formyl, lower alkanoyl, benzoyl, lower alkoxycarbonyl, sulfamoyl, lower alkylsulfamoyl, carbamoyl, lower alkylcarbamoyl, trifluoromethyl, or nitro;

$R^3$ is hydrogen, halogen, cyano or nitro;

$R^6$ is cyano, nitro, aryl, lower alkanoyl, aroyl, lower alkoxycarbonyl, lower hydroxyalkoxycarbonyl, lower alkoxy-lower-alkoxycarbonyl, or the group 13 $CONR^{4'}R^{5'}$ in which $R^{4'}$ individually is hydrogen, lower alkyl, cyclohexyl, lower alkylcyclohexyl, cyclohexylmethyl, lower alkylcyclohexylmethyl, lower hydroxyalkylcyclohexylmethyl, aryl-lower-alkyl, or aryl; $R^{5'}$ individually is hydrogen or lower alkyl; and $R^{4'}$ and $R^{5'}$ in combination are pentamethylene or ethyleneoxyethylene;

$R^5$ is hydrogen, lower alkyl, lower alkoxy, aryl-lower-alkyl or aryl;

$R^4$ is selected from $R^1$, lower alkyl, thiocyanato and arylazo;

$R^7$ is hydrogen, lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl or phenyl;

$R^8$ is hydrogen, lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio or trifluoromethyl;

$R^9$ and $R^{10}$ are fluorinated ester groups of the formula —Z—O—R;

$R^{12}$ is hydrogen, cyano, or lower alkyl;

$R^{13}$ is cyano, carbamoyl, nitro, or lower alkoxycarbonyl;

$R^{14}$ is hydrogen, lower alkyl, phenyl, phenyl substituted with halogen, lower alkyl, lower alkoxy, lower alkanoylamino, cyano, or lower alkoxycarbonyl, lower alkylsulfonyl, phenylsulfonyl, phenylsulfonyl substituted with halogen, lower alkyl, lower alkoxy, lower alkanoylamino, cyano, or lower alkoxycarbonyl; and m is 1 or 2; and C' is an aniline, tetrahydroquinoline, or benzomorpholine type coupler selected from those of the formulae

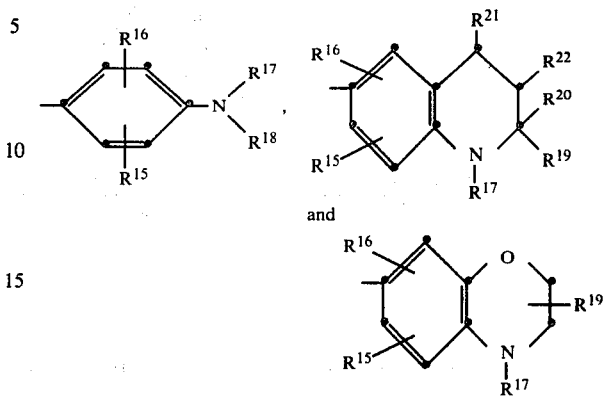

and wherein $R^{15}$ and $R^{16}$ are each selected from hydrogen, fluorine, chlorine, bromine, lower alkyl, cycloalkyl, lower alkoxy, trifluoromethyl, phenoxy, lower alkylthio, arylthio, and radicals having the formula —NH—X'—$R^{23}$ in which X' is —CO—, —COO—, or —SO$_2$—, and $R^{23}$ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X' is —CO—, $R^{23}$ is further selected from hydrogen, amino, lower alkylamino, lower alkylcarbamoyl, lower dialkylamino, arylamino, aryl, furfuryl and furyl;

$R^{17}$ and $R^{18}$ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; straight or branched alkyl of 1–8 carbons and such alkyl substituted with the following: hydroxy; halogen; cyano; amino; succinimido; glutarimido; phthalimido; 2-pyrrolidono; cyclohexyl; phenyl or phenyl substituted with lower alkyl, lower alkoxy, halogen, lower alkanoylamino, cyano or lower alkoxycarbonyl; lower alkanoyloxy; lower alkanoylamino; sulfamoyl; lower alkylsulfamoyl; vinylsulfonyl; acrylamido; phthalimidinyl; benzoylsulfonicimidyl; lower alkylsulfonamido; phenylsulfonamido; lower alkoxycarbonylamino; lower alkylcarbamoyloxy; lower alkoxycarbonyl; lower alkoxycarbonyloxy; lower alkenylcarbonylamino;

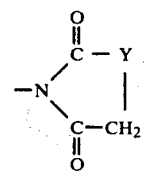

Wherein Y is —NH—,

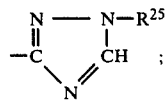
—O—, —S—, or —CH₂O—; —S—R²⁴ wherein R²⁴ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, triazolyl, or

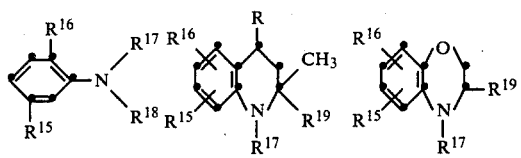

—SO₂R²³; —COOR²³; —OX'R²³; —NH—X'—R²³; —X'—R²³; —OCO—R²³; —CONR²⁵R²⁵; —SO₂NR²⁵R²⁵; wherein R²³ and X' are as defined above and each R²⁵ is selected from H and R²³; lower alkoxy; lower alkoxy substituted with hydroxy, cyano, lower alkanoyloxy, or lower alkoxy; phenoxy; phenoxy substituted with one or more of lower alkyl, lower alkoxy or halogen; and R¹⁷ and R¹⁸ combined in the aniline couplers to form with the nitrogen atom a ring containing pentamethylene, ethyleneoxyethylene or ethylenesulfonylethylene groups;

R¹⁹, R²⁰, R²¹ and R²² are each selected from hydrogen and lower alkyl.

2. An azo compound according to claim 1 wherein the coupler moieties C' have the formulae

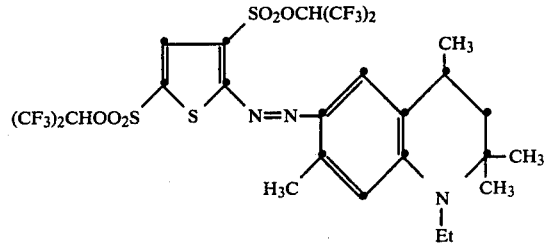

wherein

R¹⁵ is lower alkyl, lower alkoxy, lower alkanoylamino, or lower alkoxycarbonylamino;

R¹⁶ is hydrogen, lower alkyl, or lower alkoxy;

R¹⁷ and R¹⁸ are the same or different and selected from hydrogen; lower alkyl; and lower alkyl substituted with 1-3 of hydroxy, lower alkoxy, lower alkoxyalkoxy, hydroxy lower alkoxy, carbamoyl, lower alkylcarbamoyl, amino, lower alkanoylamino, sulfamoyl, lower alkylsulfamoyl, phenyl, cyclohexyl, 2-pyrrolidono, phthalimido, succinimido, cyano, phenoxy, lower alkylsulfonyl, phthalimidinyl, benzoylsulfonicimidyl, triazolylthio, lower alkylsulfonamido, —SO₂NH₂, —SO₂NH lower alkyl, phenylsulfonamido, lower alkoxycarbonylamino, lower alkylcarbamoyloxy, lower alkoxycarbonyl, lower alkanoyloxy, lower alkoxycarbonyloxy,

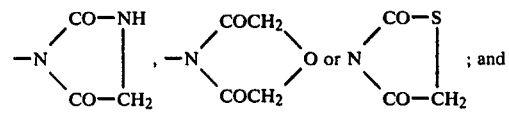

R¹⁹ and R²¹ are each hydrogen or lower alkyl.

3. The azo compound according to claim 1 having the formula

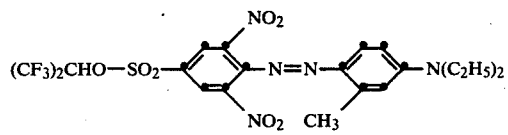

4. The azo compound according to claim 1 having the formula

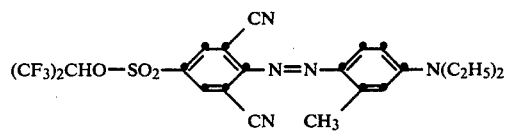

5. The azo compound according to claim 1 having the formula

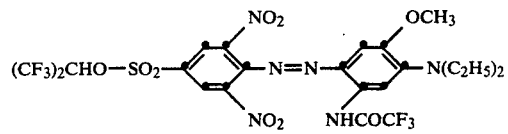

6. The azo compound according to claim 1 having the formula

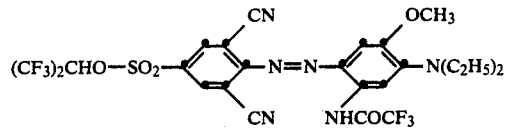

7. The azo compound according to claim 1 having the formula

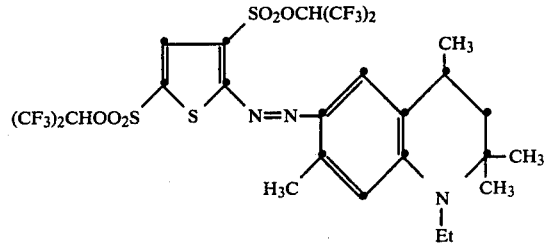

* * * * *

UNITED STATES PATENT AND TRADEMARK OFFICE
CERTIFICATE OF CORRECTION

PATENT NO. : 4,283,332
DATED : August 11, 1981
INVENTOR(S) : Robert N. Gourley

It is certified that error appears in the above-identified patent and that said Letters Patent is hereby corrected as shown below:

Column 22, lines 55-60, the structural formula (labelled D) should read

--- 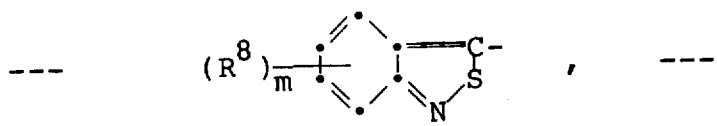 , ---

Column 23, lines 1-9, the first strucutral formula (G) should read

--- 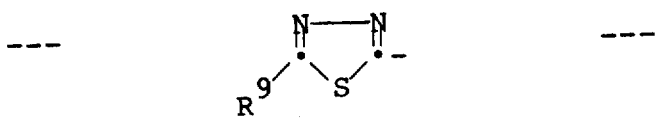 ---

Column 23, line 20, "1-3" should read --- 1-6 ---.

Column 23, line 35, "13 CONR$^{4'}$R$^{5'}$" should read --- -CONR$^{4'}$R$^{5'}$ ---.

Signed and Sealed this

Twenty-second Day of March 1983

[SEAL]

Attest:

GERALD J. MOSSINGHOFF

Attesting Officer    Commissioner of Patents and Trademarks